United States Patent [19]
Sasaki et al.

[11] Patent Number: 6,057,377
[45] Date of Patent: May 2, 2000

[54] MOLECULAR RECEPTORS IN METAL OXIDE SOL-GEL MATERIALS PREPARED VIA MOLECULAR IMPRINTING

[75] Inventors: Darryl Y. Sasaki; C. Jeffrey Brinker; Carol S. Ashley, all of Albuquerque, N.Mex.; Charles E. Daitch, Charlottesville, Va.; Kenneth J. Shea, Irvine, Calif.; Daniel J. Rush, Philadelphia, Pa.

[73] Assignee: Sandia Corporation, Albuquerque, N.Mex.

[21] Appl. No.: 09/183,848

[22] Filed: Oct. 30, 1998

[51] Int. Cl.[7] .............................. C03C 3/00; C03C 14/00; B01D 21/01; G01N 31/00
[52] U.S. Cl. ........................ 521/99; 521/106; 521/107; 521/154; 436/8; 436/73; 436/163; 501/12; 501/32; 516/98; 252/408.1; 210/656; 210/660; 210/661; 210/663
[58] Field of Search .............................. 521/99, 106, 107, 521/154; 436/8, 73, 163; 501/12, 32; 516/98; 252/408.1; 210/656, 660, 661, 663

[56] References Cited

U.S. PATENT DOCUMENTS

| | | | |
|---|---|---|---|
| 5,110,833 | 5/1992 | Mosbach | ..................................... 521/50 |
| 5,587,273 | 12/1996 | Yan et al. | ................................ 430/269 |

OTHER PUBLICATIONS

Wulff, G., "Molecular Imprinting in Cross–Linked Materials with the Aid of Molecular Templates—A Way towards Artificial Antibodies," Angew. Chem. Int. Ed. Engl. 1995, 34, 1812–1832.

Wulff, G., Heide,B., Helfmeier, G., "Molecular Recognition through the Exact Placement of Functional Groups on Rigid Matrices via a Template Approach," J. Am. Chem. Soc. 1986, 1089–1091.

Dickey, F. H., "Specific Adsorption," J. Phys. Chem. 1955, 59, 695–707.

Glad, M., Norrlöw, O., Sellergren, B., Siegbahn, N., Mosbach, K., "Use of Silane Monomers for Molecular Imprinting and Enzyme Entrapment in Polysiloxane–coated Porous Silica," J. Chromatography 1985, 347, 11–23.

Pinel, C., Loisil, P., Gallezot, P., "Preparation and Utilization of Molecularly Imprinted Silicas," Adv. Mater. 1997, 9, 582–585.

Dietrich, B., Fyles, D. L., Fyles, T. M., Lehn, J.–M., "Anion Coordination Chemistry: Polyguanidinium Salts as Anion Complexones," Helv. Chim. Acta 1979, 62, 2763–2787.

Brinker, C. J., Keefer, K. D., Schaefer, D. W., Ashley, C. S., Sol–Gel Transition in Simple Silicates, J. Non–Crystal. Solids 1982, 48, 46–65.

Sasaki, D., Rush, D., Daitch, C., Alam, T., Assink, R., Ashley, C. Brinker, C., and Shea, K., "Molecular Imprinted Receptors in Sol–Gel Materials for Aqueous Phase recognition of Phosphates and Phosphonates," American Chemical Society Symposium Series 703, R. Bartsch and M. Maeda, eds., Aug., 1998, 314–323.

*Primary Examiner*—Nathan M. Nutter
*Attorney, Agent, or Firm*—Elmer A. Klavetter

[57] ABSTRACT

A method is provided for molecularly imprinting the surface of a sol-gel material, by forming a solution comprised of a sol-gel material, a solvent, an imprinting molecule, and a functionalizing siloxane monomer of the form $Si(OR)_{3-n}X_n$, wherein n is an integer between zero and three and X is a functional group capable of reacting with the imprinting molecule, evaporating the solvent, and removing the imprinting molecule to form the molecularly imprinted metal oxide sol-gel material. The use of metal oxide sol-gels allows the material porosity, pore size, density, surface area, hardness, electrostatic charge, polarity, optical density, and surface hydrophobicity to be tailored and be employed as sensors and in catalytic and separations operations.

26 Claims, 4 Drawing Sheets

MOLECULAR RECEPTORS IN METAL OXIDE SOL-GEL MATERIALS PREPARED VIA MOLECULAR IMPRINTING

This invention was made with Government support under Contract No. DE-AC04-94AL85000 awarded by the Department of Energy. The Government has certain rights in the invention.

BACKGROUND OF THE INVENTION

The present invention relates generally to materials with molecular recognition properties. In particular, the present invention is directed toward a method of forming, using a molecular imprinting technique, metal oxide sol-gel materials with molecular recognition sites for use in sensor, separation, and catalysis operations.

Preparation of synthetic recognition, or receptor, sites for a variety of molecules in crosslinked organic polymers has previously been performed via the method of molecular imprinting. Molecular imprinting is a process for preparing materials that are selective for a particular compound (the imprint molecule) or set of related compounds. The imprinting molecule interacts with a complementary portion of a functional monomer, either covalently or by other interactions such as ionic, hydrophobic or hydrogen bonding, so that recognition sites for the imprinting molecule can be provided in the substrate material. The imprinting molecule is removed from the substrate to leave the recognition site that serves to interact with the imprinting molecule or some analogous molecule with similar physical/chemical characteristics. The material can then be used in sensor, separation or catalytic operations wherein the imprinting molecule can be targeted. The technique has also been referred to as host-guest polymerization or template polymerization.

Molecular imprinting creates specific recognition sites in materials, typically polymeric organic materials. For example, Mosbach (U.S. Pat. No. 5,110,883) describes the preparation of synthetic enzymes and synthetic antibodies by molecular imprinting techniques. Wulff (Wulff, G. *Angew. Chem. Int. Ed. Engl.* 1995, 34, 1812), prepared synthetic receptors for a variety of molecules in crosslinked organic polymers. Wulff describes investigations into a variety of binding polymers as well as siloxane monomers on different substrates, including silica gels and biopolymers. Materials prepared by Wulff et al. (Wulff, G.; Heide, B.; Helfmeier, G. *J. Am. Chem. Soc.* 1986, 108, 1089) employed diimine siloxane monomers that could be hydrolytically cleaved following attachment to the surface to yield bis-amine sites. Hydrolytic cleavage to break the covalent linkage between the template and functionalized surface created a receptor site composed of two aromatic amines spaced at a specific distance determined by the geometry of the dialdehyde template. Gels imprinted with diimines of isophthalaldehyde and (4,4'-dibenzaldehyde)methane showed good selectivities for their respective template molecules. Wulff (1995) also points out the potential uses of these materials in separations, such as chromatography and membrane operations, sensors, chemical reactions, and catalysis.

Yan et al. (U.S. Pat. No. 5,587,273) describe a molecular imprinting method using organic polymers, particularly allowing the manufacture of thin films on surfaces such as silicon wafers. This method has shown that some highly selective receptor sites can be built for complex molecules such as sugars, amino acids, peptides, nucleosides, among others, that operate in polar organic solvents. However, in aqueous solutions, imprinted polymers lose their affinity for substrates. Improvements in binding efficiencies may be achieved through a modification of the matrix or, alternatively, use of aqueous compatible materials such as metal oxide gels.

Molecular imprinting in metal oxide materials has been successfully achieved by other researchers including what is considered the first example of molecular imprinting by Dickey (Dickey, F. H, *J. Phys. Chem.* 1955, 59, 695), preparing silica gels in the presence of certain dyes. Dickey used a sol-gel method that created bulk phase material with dye molecules imbibed throughout the gel matrix. Washing of the gel removed the dye molecules leaving behind an imprinted site with recognition properties for the dye. Imprinted materials were produced using methyl, ethyl, propyl, and butyl orange dyes as templates and in each material the molecular recognition properties was greatest for the original template.

Glad et al., (Glad, M.; Norrlöw, O.; Sellergren, B.; Siegbahn, N.; Mosbach, K. *J. Chromatography* 1985, 347, 11) used a surface imprinting technique to prepare receptor sites on commercially obtained silica gel. Glad et al. used a unique blend of phenyltriethoxysilane, N-2-aminoethyl-3-aminopropyltrimethoxysilane, and bis(2-hydroxy-ethyl)aminopropyltriethoxysilane monomers to heavily functionalize a silica surface. The gelation was performed in the presence of dye molecule Rhodanile blue or Safranine O at high temperature (85° C.) and at low pH (2.5–3.0). The resultant materials exhibited good recognition properties for their original templates.

Recently, Pinel et al. used imprinted metal oxide sol-gels to separate enantiomers of menthol (Pinel, C.; Loisil, P.; Gallezot, P. *Adv. Mater.* 1997, 9, 582). The tetraethylorthosilicate sol-gel materials imprinted with (−)-menthol were catalyzed with acid, base, or fluoride and aged for two weeks prior to removal of template. Although the resultant gels gave no enantioselectivity in the binding of menthol, regioselectivity was observed with o-cresol having enhanced affinity over p-cresol, which is the opposite order of affinity on a control gel.

In addition to the use of these molecular recognition materials in separations operations, the materials can also be used in sensor and catalysis operations. For example, as sensor materials, molecular imprinted sol-gel materials offer ideal optically transmissive properties for optical detection schemes. Defense agencies are currently interested in remote and point sensors for the detection of chemical and biological weapons. Selective binding of phosphonate compounds at low concentration levels can allow the detection of nerve agents at levels below the threshold of human harm. The molecular imprinting technique of the present invention demonstrates the ability to build recognition sites for phosphonates compounds at the part per million (ppm) to tens of ppm level. For sensor applications, the selective and rapid detection of phosphate and phosphonate compounds, which include numerous biologically important signaling molecules as well as pesticides and chemical warfare agents, is dependent upon the development of efficient host-guest systems. The molecular imprinted sol-gel silicate materials of the present invention using guanidinium functionalized silanes offer high binding affinities ($K_a=10^3$ $M^{-1}$) in aqueous solution for phosphates and phosphonates, which is one to two orders of magnitude higher than reported host-guest complexes (Dietrich, B.; Fyles, D. L.; Fyles, T. M.; Lehn, J.-M. *Helv. Chim. Acta* 1979, 62, 2763). The imprinted receptor sites show an improvement of about a factor of two higher in binding constants compared to randomly functionalized material.

Catalytic materials have been prepared in organic and silica materials through the molecular imprinting technique (see, for example, Wulff, 1995). The sol-gel process and post-modification methodology of the present invention allows access to uniquely functionalized receptor sites in inorganic and hybrid materials for catalysis for a variety of reactions. The aqueous compatibility of silica based materials allows access to catalytic reactions in aqueous solution, allowing chemical industries to perform reaction sequences in water and thereby reducing costs in solvents and environmental waste.

The ability to prepare robust inorganic materials with molecular recognition sites that function efficiently in both nonpolar and polar environments would offer a major improvement in the ability to generate separation materials for a larger variety of substrates and solvent systems. In particular, through the herein described sol-gel process and facile post modification of the materials, rapid tailoring can yield a large variety of substrate selective materials.

SUMMARY OF THE INVENTION

According to the present invention, a method is provided for molecularly imprinting the surface of a sol-gel material, comprising forming a solution comprised of a sol-gel material, a solvent, an imprinting molecule, and a functionalizing siloxane monomer of the form $Si(OR)_{3-n}R'X_n$, wherein n is an integer between zero and three, R is hydrogen or an alkane of carbon length less than 5, R' is a spacer molecular group comprising a carbon-containing segment of a length not exceeding 15 Å, and X is a functional group capable of reacting with the imprinting molecule, evaporating the solvent, and removing the imprinting molecule to form the molecularly imprinted metal oxide sol-gel material. In one aspect of the invention, the sol-gel material may be either an xerogel or aerogel and is selected from the group consisting of a silicate sol-gel, a titanate sol-gel and an aluminosilicate sol-gel.

According to the present invention, the imprinting molecule can be a phosphonic acid, phosphoric acid, sulfonic acid, sulfuric acid, or carboxylic acid. In the functionalizing siloxane monomer, the functional group can be a guanidine, amidinium, ammonium, amine, histidine, N-heterocycles, metal ion chelate, iodonium, or phenol. In one embodiment of the present invention, the monomer is a new compound, 3-trimethoxysilyl propyl-1-guanidinium chloride.

An important aspect of the invention is that the metal oxide sol-gel material has tailorable porosity, pore size, density, surface area, hardness, electrostatic charge, polarity, optical density, and surface hydrophobicity properties. Also important is that the use of the metal oxide sol-gel material allows operation in both aqueous and non-aqueous environments, contrasting these molecularly imprinted materials from prior art. These characteristics permit selective and rapid binding of selected molecule in these molecular recognition materials of the present invention and allow the materials to be employed as sensors and in catalytic and separations operations.

DETAILED DESCRIPTION OF THE INVENTION

Figure 1:
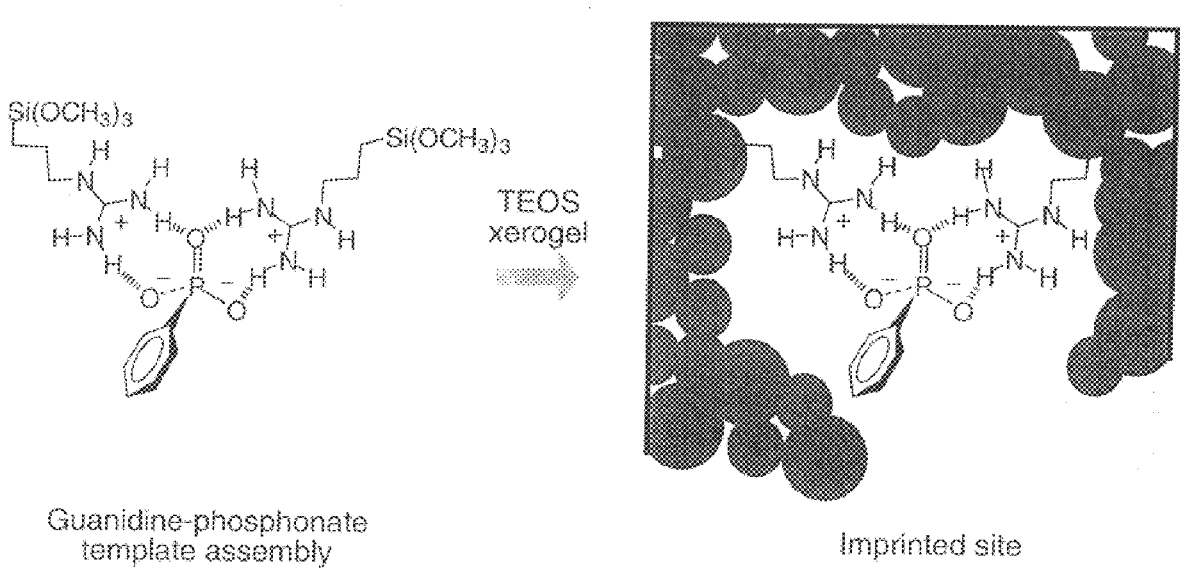
FIG. 1. Idealized bis-guanidine receptor site for phosphonate.

The molecular imprinting method of the present invention uses non-covalent interactions between functionalized siloxane monomers and an imprinting molecule to preorganize functionality prior to attachment to a metal oxide gel surface. Following attachment to the surface, the imprinting molecule is removed by washing the gel, creating functionalized receptor sites on the gel surface that have selective adsorption for the original template molecule. The surface imprinting technique employed in the present invention positions the molecular receptors at or very near the gel surface to allow rapid binding equilibration between host and guest. Physical properties of the gel matrix can be tailored prior to receptor formation.

The sol-gel molecular imprinting method of the present invention allows the preparation of a broad range of inorganic solid materials, particularly metal oxide sol gels and more particularly silicate, titanate, and aluminosilicate sol gels that have molecular recognition capability. Known in the art is the capability to control material size and shape, chemical structure, and process conditions of these metal oxide sol gels. The process conditions can be used to tailor the material's hardness (crosslink density), surface hydrophilicity (surface silanols), and internal pore dimensions. The material's chemical structure can be modified in various ways to affect binding and transport properties of solution or gas phase substrates. For example, in addition to the density of surface silanols, hydrophobicity of the material can also be tailored by incorporating organic modified silanes through the sol-gel process. Likewise, incorporation of functionalized silanes can adjust the material's electrostatic charge, polarity, optical density, and other properties. Tailoring of these properties can significantly affect binding affinities in host-guest complexation and rate of transport of substrates to imbedded receptor sites that ultimately affect separation factors in liquid chromatography and response times in sensor applications. As also known in the art, these metal oxide sol-gel materials are effective in both aqueous and non-aqueous environments. These capabilities of the present invention to allow modification of the material to interact with analytes of interest means that the resulting product can be used in sensor applications, separation or purifying applications, and catalytic and other chemical reaction applications.

In the general method of preparing molecularly imprinted materials by the present invention, a solution is formed comprising a sol-gel material, a solvent, an imprinting molecule and a functionalizing monomer. If desirable for the application under consideration, the sol-gel material may have been previously formed as a xerogel, which is a gel that has been drying under conditions that cause shrinkage of the gel network, or formed as an aerogel material, which is a gel that has been dried under supercritical conditions so that there is relatively little shrinkage. Xerogels and aerogels can be useful in applications such as catalysis, filtration and the preparation of dense ceramics. The sol-gel material of the present invention is a metal oxide sol-gel and more particularly, a silicate, titanate, or aluminosilicate sol gel.

The functionalizing monomer has the general form $Si(OR)_{3-n}R'X_n$, wherein n is an integer between zero and three, R is hydrogen or an alkane of carbon length less than five, R' is a spacer molecular group comprising a carbon-containing segment of a length not exceeding 15 Å, and X is a functional group capable of reacting with the imprinting molecule. One such functionalizing monomer, and more particularly is a novel compound according to the present invention, 1-trimethoxysilylpropyl-3-guanidinium chloride, $(CH_3O)_3SiCH_2CH_2CH_2NHC(NH)NH_2 \cdot HCl$, where the functional group X is $NHC(NH)NH_2 \cdot HCl$. This new compound is a strongly interacting monomer for a phosphonic acid template molecule that also affords facile reaction with the metal oxide sol-gel surface. Another such monomer, known in the art, is 1-trimethoxysilylpropyl-3-ammonium chloride; this compound also provides strong interaction with phosphonic acids in aqueous solution. Other functionalized siloxane monomers that could be used for imprinting metal oxide gels for molecular memory of organic acids have the following restraints in chemical structure. First, the polymerizable group consists of a reactive metal ligand, which includes but is not exclusive to metal halogens, metal alkoxides, or metal hydroxides. The metals considered here comprise silicon, aluminum, germanium, and titanium. Second, the functional group consists of moieties having cationic character and/or hydrogen bonding capability. These functional groups include guanidines, amidines, ammoniums, histidines, N-heterocycles, amines, metal ion chelates and other organometallics, iodoniums, and phenols. And finally, the spacer molecular group, R', that separates the polymerizable group from the functional group, comprises a carbon containing segment of a length not exceeding 15 Å. The spacer can be an alkane, either branched or linear, or aromatic, either substituted or unsubstituted. In the monomer, 1-trimethoxysilylpropyl-3-guanidinium chloride, $(CH_3O)_3SiCH_2CH_2CH_2NHC(NH)NH_2 \cdot HCl$, the propyl group, $CH_2CH_2CH_2$, is an example of such a spacer. Functional groups can also exist off the spacers.

The solution sits for a time period to allow solidification and the imprinting molecule and solvent are removed to form the molecularly imprinted material. One example of an imprinting molecule is phenylphosphonic acid (PPA), which is an efficient template, or imprint, molecule. Other types of organic acids that can serve as template molecules include other phosphonic acids, phosphoric acids, sulfonic acids, sulfuric acids, and carboxylic acids. The acids can be in their partial ester forms but at least one site must have a hydroxyl group for strong interaction with the functionalized siloxane monomer.

The imprinting is done essentially at the surface of the material, in contrast to the organic-polymer-based molecular imprinting approaches wherein the imprinted sites occur both on the surface of the polymeric material as well as in the interior of the material. In the surface-imprinted gels of the present invention, the sites are essentially all located near the surface of the matrix, thereby allowing rapid equilibration, typically less than approximately 5 minutes, for the interactions between the molecularly imprinted material and the desired analyte or original template or imprinting molecule.

In one embodiment of the method of preparing metal oxide sol-gel materials with molecular recognition sites, a metal oxide xerogel was first prepared from tetraethoxysilane (TEOS) or tetramethyloxysilane (TMOS) using a standard literature procedure for sol-gel processing (Brinker, C. J.; Keefer, K. D.; Schaefer, D. W.; Ashley, C. S. *J. Non-Crystal. Solids* 1982, 48, 47; incorporated herein by reference). Modifications of the sol-gel process, such as by varying solvents, temperature, catalyst, and monomers, can be introduced to tailor the gel matrix with desired properties. Properties that can be controlled include porosity, pore size, density, surface area and surface hydrophobicity.

Surface imprinting of the xerogel was accomplished as follows. The xerogel is functionalized with a functionalizing monomer, a guanidine siloxane monomer, 3-trimethoxysilyl propyl-1-guanidinium chloride, prepared through a one step transformation of 1-trimethoxysilylpropyl-3-amine with 1-H-pyrazole-1-carboxamidine hydrochloride as described in Example 1. The monomer was coordinated through non-covalent interactions to the template molecule phenylphosphonic acid (PPA) in a 2:1 ratio in an ethanol solution prior to surface attachment. An idealized preorganization of siloxane monomer 3-trimethoxysilyl propyl-1-guanidinium chloride—PPA template assembly is illustrated in FIG. 1. The assembly was covalently linked to the metal oxide surface at 50° C. and allowed to dry over 12 hours. The solvent and imprinting molecule were removed and the finished material gently ground and sieved to appropriate size.

Another embodiment of the present invention is a metal oxide sol-gel material with molecular recognition sites comprising a functionalizing monomer, and more particularly, a guanidine siloxane monomer, 3-trimethoxysilyl propyl-1-guanidinium chloride attached to a metal oxide sol-gel surface, wherein the metal oxide sol-gel material has been molecularly imprinted with an imprinting molecule selected from the group consisting essentially of phosphonic acids, phosphoric acids, sulfonic acids, sulfuric acids, and carboxylic acids, and more particularly, phenylphosphonic acid.

Structural information of the xerogels was obtained through $^{29}Si$ solid state MAS NMR providing quantitative determination of the extent of condensation of the matrix and functionalization with the 3-trimethoxysilyl propyl-1-guanidinium chloride. Direct polarization $^{29}Si$ NMR was used to quantify the Q, or $Si(OR)_4$, species in the silica gel, where R=Si, H, or ethyl. From the abundance of various Q species the extent of condensation of matrix silica was determined. The blank xerogel was found to have 90±1% condensation indicating high crosslinking. A comparison of blank xerogel and xerogel functionalization with 3-trimethoxysilyl propyl-1-guanidinium chloride found that functionalization at 1 or 4 mole % does not affect condensation of the gel matrix. Cross-polarization experiments measuring the T silicon $(SiR'(OR)_3$, where R=Si, H, or methyl and R'=propyl-3-guanidinium) of covalently bound 3-trimethoxysilyl propyl-1-guanidinium chloride determined an incorporation of 3-trimethoxysilyl propyl-1-guanidinium chloride into the gel at 93±10% with an extent of condensation of 91±2%. Thus, the procedure used for surface functionalization was successful with near quantitative coupling of siloxane monomer to the matrix and approximately three point covalent attachment.

Surface area analyses have been performed on these materials to determine any gross structural changes that might occur upon guanidine functionalization of the xerogel surface. Table I shows nitrogen BET analyses of blank xerogel and gels randomly functionalized with 3-trimethoxysilyl propyl-1-guanidinium chloride at 2% and 4%, and an imprinted gel with 4% of 3-trimethoxysilyl propyl-1-guanidinium chloride and PPA in a 2:1 ratio. The percentages of 3-trimethoxysilyl propyl-1-guanidinium chloride are indicated as a mole percent relative to total silicon in the gel. With 2% functionalization the xerogel shows only a slight increase in surface area to 915 m²/g over the non-functionalized material (876 m²/g) but a 65% increase in pore volume. Upon further functionalization to 4% the surface area drops appreciably (836 m²/g) along with pore volume. The addition of PPA template brings about a further decrease in surface area while pore volume remains constant. Overall the functionalization process does not significantly alter the xerogel structure, however, some trends were observed. Most noticeable is that surface functionalization with 3-trimethoxysilyl propyl-1-guanidinium chloride leads to an increase in pore volume of 35–65%. Since 3-trimethoxysilyl propyl-1-guanidinium chloride can act as a capping agent for surface silanols, surface functionalization could minimize condensation across walls of collapsed pores leading to higher pore volumes for functionalized xerogels. With an average calculated area per bound guanidine of 225 Å², site isolation is highly probable assuming random distribution.

TABLE I

BET Surface Area Analysis

| % 1/SiO$_2$ | Template molecule | Surface area (m²/g) | Pore volume (cm³/g) |
|---|---|---|---|
| 0 | none | 876 | 0.63 |
| 2 | none | 915 | 1.01 |
| 4 | none | 836 | 0.86 |
| 4 | PPA | 771 | 0.85 |

1 = 3-trimethoxysilyl propyl-1-guanidinium chloride

Figure 2:
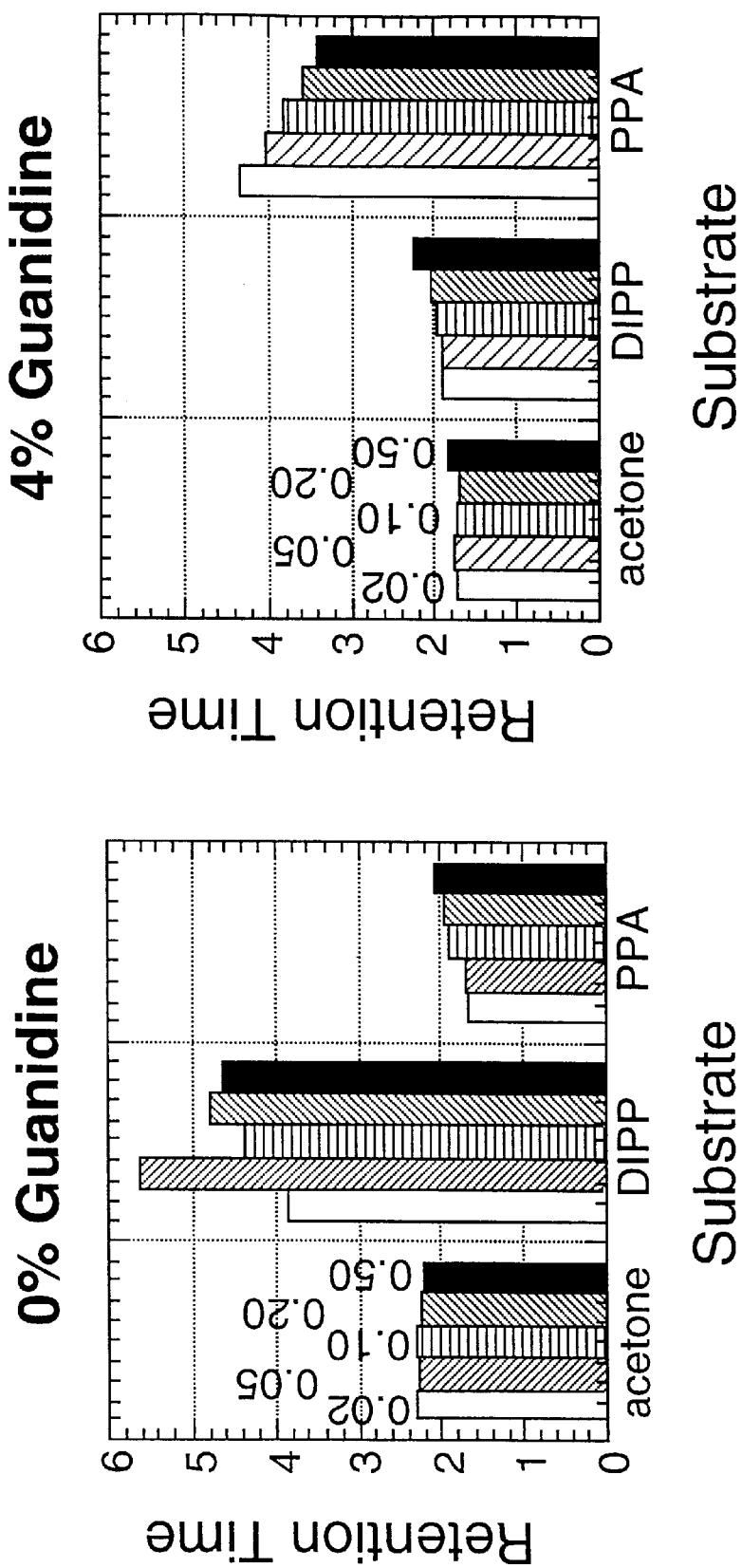
FIG. 2. HPLC study of the effect of ionic strength on substrate affinity to blank and functionalized xerogel. Ionic strength increases from left to right above each substrate from 0.02, 0.05, 0.10, 0.20, to 0.50.

Affinity studies were conducted with functionalized and blank metal oxide gels to identify specific and non-specific interactions with guest substrates. Relative affinities of a phosphonate diester, diisopropylphenylphosphonate (DIPP), and a phosphonic acid, phenylphosphonic acid (PPA), to blank and randomly functionalized 4% guanidine xerogels were measured via HPLC analyses. In an ionic strength study, the contribution of ionic interaction between host and guest were qualitatively determined. The eluent was a solvent mixture of 95% 0.01M potassium phosphate buffered water at pH 6.0 and 5% acetonitrile. Ionic strength was adjusted with KCl. Specific interaction of a guanidine with phosphonic acid should involve a combination of electrostatics and hydrogen bonding interactions. On the other hand, binding of phosphonate diester would occur solely through hydrogen bonds. FIG. 2 shows the effect of ionic strength on retention time to blank and functionalized gels with acetone, DIPP, and PPA. Ionic strength is indicated in the bar graph. Acetone, which has no specific interaction with the materials, exhibits no difference in affinity to both gels and no effect due to changes in ionic strength. DIPP exhibits a high non-specific affinity to the blank xerogel, however, affinity decreases upon functionalization of the gel. Conversely, PPA shows no affinity for blank gel but high affinity for the 4% guanidine gel. Functionalization of the gel with 3-trimethoxysilyl propyl-1-guanidinium chloride effectively minimizes non-specific interaction of phosphonate esters while adding specificity for phosphonic acids. For the specifically interacting PPA and guanidine functionalized gel increasing ionic strength results in the attenuation of affinity. This confirms the existence of an ionic contribution between the PPA-guanidine complex. The guanidine-phosphonate complex also has a hydrogen bonding component, which contributes to substrate complexation observed in proteins. That the PPA-guanidine interaction remains significant even at high ionic strength (0.50M) may be attributed to the existence of such hydrogen bonds. Hydrogen bonding between DIPP and guanidine, however, does not appear to be significant in the aqueous system.

Figure 3:
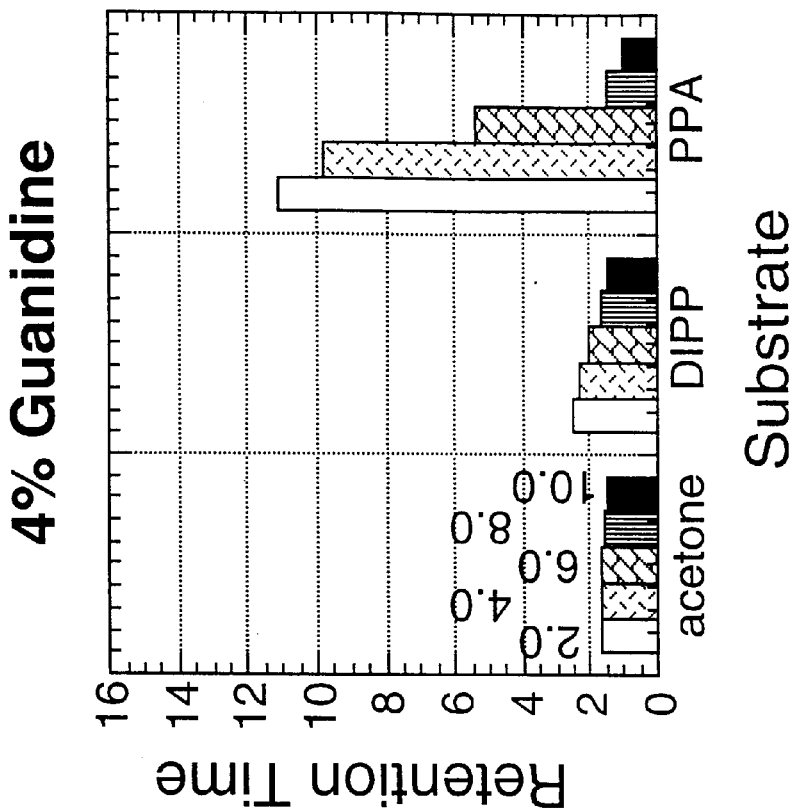
FIG. 3. HPLC study of the effect of pH on substrate affinity on blank and functionalized xerogels. pH increases from left to right above each substrate in the order of 2.0, 4.0, 6.0, 8.0, and 10.0.
Figure 3:
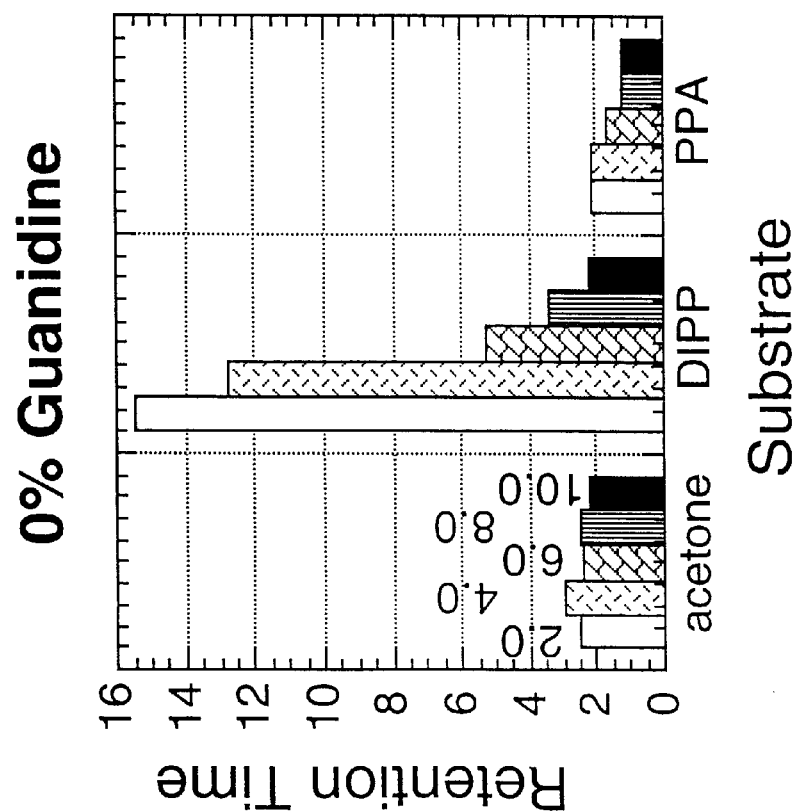

An additional HPLC study on the influence of pH found that the gel matrix has a profound influence on substrate binding affinity. The mobile phase in these studies was a 5% acetonitrile/95% aqueous phosphate buffer solution adjusted to the desired pH, and ionic strength held at 0.05 with added KCl. FIG. 3 shows a comparison of blank and randomly functionalized xerogel binding with acetone, DIPP, and PPA at several pH's varying from 2 to 10. Acetone was unaffected by changes in pH or gel type whereas both DIPP on the blank gel and PPA on functionalized gel showed reduced affinity with increasing pH and a complete loss of affinity at pH 8 and above. In terms of guanidine-PPA pairing, near neutral pH should provide the best conditions for strong ionic interaction. However, the silanol groups on the silica surface are acidic and anionic surface charge increases with pH greater than 2. At lower pH the silica surface is close to neutral charge allowing the guanidinium group to freely bind with PPA. At higher pH, an anionic matrix could force the cationic guanidinium to interact with the surface and severely restrict binding with the anionically charged PPA guest. Additionally, ionic repulsion between the anionic matrix and anionic substrate may also contribute to reduced affinity at high pH. Also, it is possible that surface effects may lower the $pK_a$ of guanidinium (13.6 in water) thereby minimizing electrostatic interactions with PPA at pH's lower than anticipated. It is unclear why DIPP has a pH dependent non-specific interaction to the blank gel. Functionalization of the gel with 3-trimethoxysilyl propyl-1-guanidinium chloride, however, removes all non-specific affinity at all pH levels.

Figure 4:
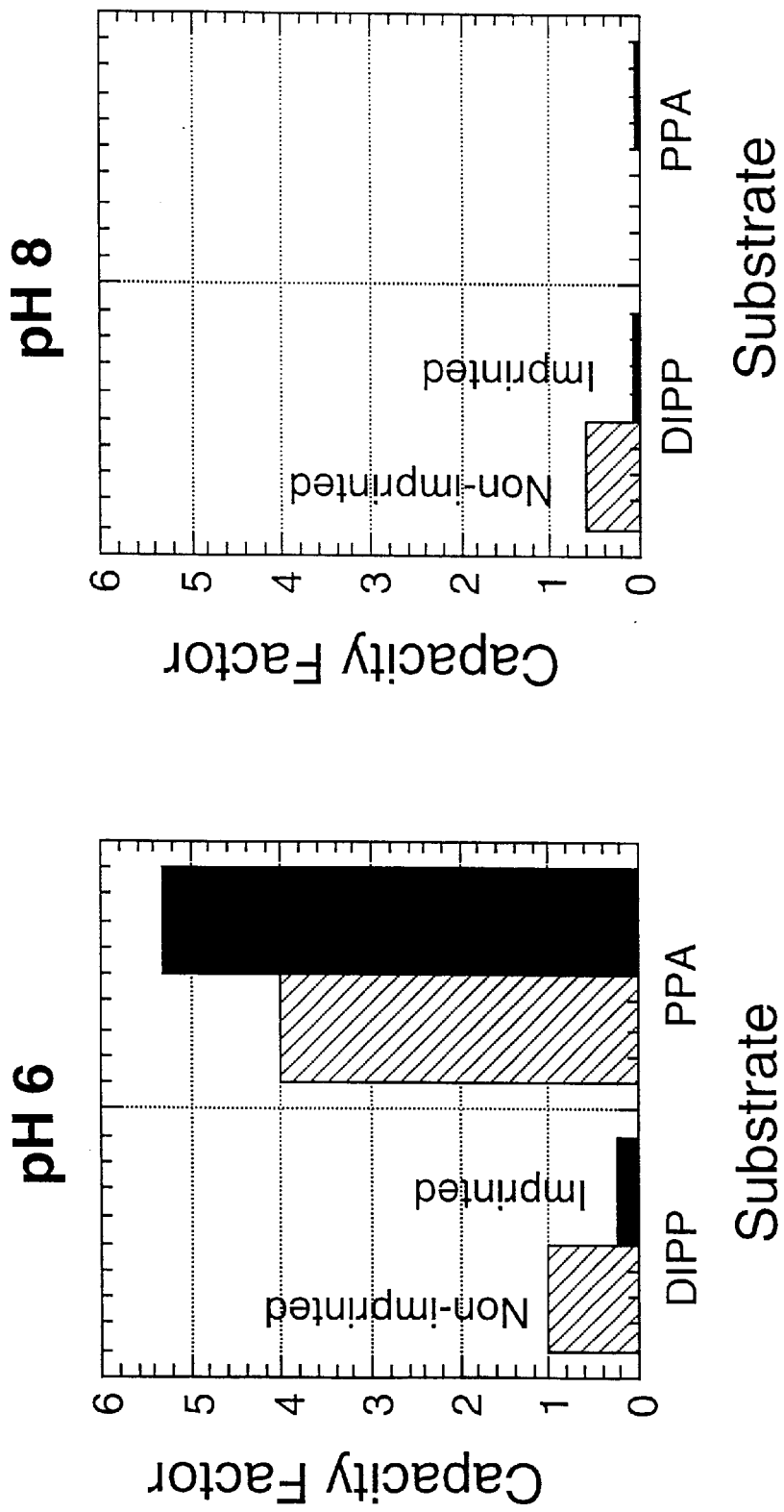
FIG. 4. A comparison of HPLC capacity factors of imprinted, or templated, vs. non-templated guanidine functionalized xerogels at pH 6 and 8, run with DIPP and PPA substrates.

Molecular recognition properties in the imprinted materials were assessed via HPLC analyses and adsorption studies. Results shown in FIG. 4 demonstrate the capability of the present invention to create molecular receptor sites in sol-gel materials. An HPLC study was performed comparing the affinity of PPA with randomly functionalized vs. imprinted guanidine xerogels. The two graphs of FIG. 4 show a comparison of capacity factors for DIPP and PPA to the xerogels at pH's 6 and 8. At pH 6, PPA shows a significantly higher affinity for the PPA imprinted material with a 25% enhancement in capacity factor over the randomly functionalized material. Molecular imprinting was effective in the generation of molecular recognition sites in the material. The diester DIPP substrate, which binds through non-specific interaction with the gel, showed a reduced affinity for the imprinted gel compared to the randomly functionalized gel. The non-specific affinity for DIPP may be affected by differences in surface area, which appears as a by-product of molecular imprinting as found through BET analysis (Table I). At pH 8, there was a complete loss of affinity of PPA to the xerogel. It is evident from these studies that the surface near the receptor site is important in host-guest interactions.

Further evaluation of the molecularly imprinted xerogels was assessed through experimentally determined binding isotherms obtained in water at pH 5. Table II shows binding constants and binding capacities (guanidine/substrate) for blank, randomly functionalized, and imprinted xerogels with $PO_4$ and PPA guest substrates. Blank xerogel binds neither $PO_4$ nor PPA. Randomly functionalized silica yields good binding constants for $PO_4$ (600 M$^{-1}$) and PPA (1100 M$^{-1}$) in water. Molecular imprinting with PPA yields an enhancement of >2 in binding constants for both $PO_4$ (~1500 M$^{-1}$) and PPA (2600 M$^{-1}$) compared to randomly functionalized gel. These results combined with the above HPLC study show that it is possible to generate refined receptor sites in sol-gel materials through a surface imprinting technique. Additional effects, such as hydrophobicity, also appear to play a role in binding of substrates to the xerogels. For example, PPA, which has a hydrophobic phenyl substituent, exhibits about a two fold stronger $K_a$ than the highly water-soluble $PO_4$ in both imprinted and non-imprinted functionalized materials. Interfacial phenomena may promote stronger partitioning of the hydrophobic substrate to the gel bound receptor.

TABLE II

Binding Data of Imprinted and Non-imprinted Xerogels

| % Guan. | Guan. Template | Substrate | $K_a$ $(M^{-1})^a$ | Guan: Substrate |
|---|---|---|---|---|
| 0 | none | $PO_4$ | 0 | |
| 0 | none | PPA | 0 | |
| 4 | none | $PO_4$ | 600 | 1.6:1 |
| 4 | none | PPA | 1100* | 2.0:1 |
|  |  |  | 1400 | 2.5:1 |
| 4 | 2:1 PPA | $PO_4$ | 1600* | 2.8:1 |
| 4 | 2:1 PPA | PPA | 2600* | 2.8:1 | a)Data with * were obtained by $^{31}P$ NMR, otherwise phosphate analysis was used.

EXAMPLES

Example 1

Preparation of 1-Trimethoxysilylpropyl-3-Guanidinium Chloride

3-Amino-1-trimethoxypropylsilane (10.0 g, 55.8 mmole) and 1-H-pyrazole-1-carboxamidine hydrochloride (8.20 g, 55.9 mmole) were placed in dry methanol (30 mL) and stirred for 15 hours at room temperature. The solvent was then removed in vacuo leaving a viscous, colorless oil. The oil was purified by Kugelrohr distillation (150° C., 100 mmHg) to remove pyrazole by-product. A clear, colorless, viscous oil of the product 3-trimethoxysilyl propyl-1-guanidinium chloride remained (12.7 g, 88%). $^1H$ NMR (CDCl$_3$) δ 7.83 (t, J=6.5 Hz, 1H, CH$_2$N$\underline{H}$), 7.07 (br s, 4H, N$\underline{H}_2$), 3.58 (s, 9H, OC$\underline{H}_3$), 3.20 (dt, J=6.5, 6.5 Hz, 2H, NHC $\underline{H}_2$), 1.72 (m, 2H, C$\underline{H}_2$), 0.72 (t, J=7.8 Hz, 2H, Si—C$\underline{H}_2$). $^{13}C$ NMR (CDCl$_3$) δ157.75, 50.59, 43.31, 22.42, 5.83. IR (NaCl) 3330, 3166, 2946, 2850, 1652, 1469, 1192, 1083, 8199 cm$^{-1}$. High resolution MS calcined for C$_7$H$_{20}$N$_3$O$_3$Si: 222.1274. Found: 222.1281.

Example 2

Preparation of Molecularly Imprinted Xerogels

Ethanol (305 mL) and tetraethoxysilane (305 mL) were stirred in a 1 L vessel followed by the addition of water (24.5 mL) and 1N aqueous HCl (1 mL). The mixture was warmed to 60° C. with stirring for 1.5 h, then cooled to room temperature to afford the homogeneous sol solution. To the sol (91 mL) was added 0.1 M aqueous NH$_4$OH (9.1 mL). The solution gelled overnight and was aged in a closed container at 50° C. for a day. The gel was then crushed, washed with ethanol twice, collected, placed in fresh ethanol (200 mL), and kept at 50° C. overnight. For molecular imprinting, the gel was collected and placed in a 100 mL solution of ethanol containing 3-trimethoxysilyl propyl-1-guanidinium chloride (8.0 mmole) and phenylphosphonic acid (4.0 mmole) template and the mixture incubated for another day at 50° C. The solvent was subsequently evaporated at 50° C. over a period of 12 hours. Blank and randomly functionalized xerogels were prepared identically with the exclusion of 3-trimethoxysilyl propyl-1-guanidinium chloride and phenylphosphonic acid (PPA) for the blank gel and of PPA for the randomly functionalized gel. The xerogel was then crushed to a 250–75 micron particle size, washed with ethanol, and dried under vacuum at 60° C. for a day. To remove the imprinting molecule, PPA, all materials were washed three times with 1 N aqueous HCl solution (100 mL/g xerogel) by swirling one hour for each wash at room temperature. Quantitative removal of PPA template was determined by UV analysis (PPA in 50% methanol/1N aqueous HCl, e=8332 at 210 nm).

Example 3

HPLC Analysis

Xerogels with a particle size of 25–38 mm were slurry packed into a 4.6 mm i.d.×100 mm HPLC column which was connected to a Waters 600-MS HPLC fitted with a Waters 484 tunable wavelength UV detector set at 260 nm. All studies used a mobile phase consisting of 95% aqueous buffer solution/5% acetonitrile. The ionic strength dependence study used an aqueous buffer composed of 0.01 M potassium phosphate adjusted to pH 6.0 with either HCl or KOH, and the ionic strength was adjusted to the appropriate value by the addition of KCl. The pH dependence study used an aqueous buffer composed of 0.01 M potassium phosphate adjusted to the appropriate pH with either HCl or KOH, where the ionic strength was maintained at 0.05M with the addition of KCl. Capacity factors for FIG. 4 were determined using acetone as the void volume marker, an aqueous phase of 0.01 M potassium phosphate buffer adjusted to pH 6.0 or 8.0, and an ionic strength of 0.05M.

Example 4

Rebinding Studies

Xerogel (50 mg) at 150–75 mm particle size was placed in a solution containing phosphate or phosphonate substrate at various concentrations in a volume such that the total bound substrate in the xerogel amounted to less than 10 mole % of the total substrate in solution. Although the solution equilibrates with the xerogel in minutes, typically less than about 5 minutes, the solution was swirled overnight prior to analysis. An aliquot was taken from the solution and analyzed for depletion by an acid molybdate/Fiske & SubbaRow reducer assay (Sigma Chemicals) for $PO_4$ or by $^{31}P$ NMR for PPA. The binding data were evaluated by Scatchard plots to yield binding constants and binding capacities.

The foregoing discussion discloses and describes only certain exemplary embodiments of the present invention. One skilled in the art will readily recognize from such discussion, and from the accompanying drawings and claims, that various changes and modifications can be made therein without departing from the spirit and scope of the invention as defined in the following claims.

What is claimed is:

1. A method for molecularly imprinting the surface of a sol-gel material, comprising:
   forming a solution comprised of a sol-gel material, a solvent, an imprinting molecule, and a functionalizing siloxane monomer of the form Si(OR)$_{3-n}$R'X$_n$, wherein n is an integer between zero and three, R is hydrogen or an alkane of carbon length less than five, R' is a spacer molecular group comprising a carbon-containing segment of a length not exceeding 15 Å, and X is a functional group capable of reacting with the imprinting molecule;

evaporating the solvent; and removing the imprinting molecule to form the molecularly imprinted metal oxide sol-gel material.

2. The method of claim 1 wherein the sol-gel material is a sol gel selected from the group consisting of a silicate sol gel, a titanate sol gel and an aluminosilicate sol gel.

3. The method of claim 1 wherein the sol-gel material is a xerogel.

4. The method of claim 1 wherein the sol-gel material is an aerogel.

5. The method of claim 1 wherein the imprinting molecule is a compound selected from the group consisting of phosphonic acids, phosphoric acids, sulfonic acids, sulfuric acids, and carboxylic acids.

6. The method of claim 5 wherein the imprinting molecule is phenylphosphonic acid.

7. The method of claim 1 wherein the spacer molecular group is selected from the group consisting of alkanes and aromatics.

8. The method of claim 7 wherein the spacer molecular group is a propyl group.

9. The method of claim 1 wherein X is selected from the group consisting essentially of guanidines, amidines, histidines, N-heterocycles, ammoniums, amines, metal ion chelates, iodoniums, and phenols.

10. The method of claim 1 wherein the functionalizing siloxane monomer is 3-trimethoxysilyl propyl-1-guanidinium chloride.

11. The method of claim 10 wherein the pore volume is increased by approximately 35% to approximately 60%.

12. The method of claim 1 wherein the sol-gel material has tailorable porosity, pore size, density, surface area, hardness, electrostatic charge, polarity, optical density, and surface hydrophobicity properties.

13. The method of claim 1 wherein the imprinting molecule is removed by washing with an acid.

14. The method of claim 1 wherein the solvent is an organic solvent.

15. The method of claim 14 wherein the solvent is an alcohol.

16. The method of claim 1 wherein the formed molecularly imprinted metal oxide sol-gel material can equilibrate with a compatible guest molecule in less than approximately 5 minutes.

17. A method for molecularly imprinting the surface of a sol-gel material, comprising:

forming a solution comprised of a sol-gel material, a solvent, an imprinting molecule, and the functionalizing siloxane monomer 3-trimethoxysilyl propyl-1-guanidinium chloride, wherein the imprinting molecule is a compound selected from the group consisting essentially of phosphonic acids, phosphoric acids, sulfonic acids, sulfuric acids, and carboxylic acids;

evaporating the solvent; and removing the imprinting molecule to form the molecularly imprinted metal oxide sol-gel material.

18. The method of claim 17 wherein the imprinting molecule is selected from the group consisting essentially of phosphonic acids, phosphoric acids, sulfonic acids, sulfuric acids, and carboxylic acids.

19. The method of claim 18 wherein the imprinting molecule is phenylphosphonic acid.

20. The method of claim 17 wherein the formed molecularly imprinted metal oxide sol-gel material functions as a molecular recognition material in aqueous solutions.

21. A molecularly imprinted metal oxide sol-gel material comprising 3-trimethoxysilyl propyl-1-guanidinium chloride attached to a metal oxide sol gel, wherein the metal oxide sol-gel material has been molecularly imprinted with an imprinting molecule selected from the group consisting essentially of phosphonic acids, phosphoric acids, sulfonic acids, sulfuric acids, and carboxylic acids.

22. The molecularly imprinted metal oxide sol-gel material of claim 21 wherein the imprinting molecule is phenylphosphonic acid.

23. The molecularly imprinted metal oxide sol-gel material of claim 22 wherein a phosphate-containing solution can chemically equilibrate with the material in less than approximately 5 minutes.

24. A sensor employing the molecularly imprinted metal oxide sol-gel material of claim 21.

25. A catalytic process employing the molecularly imprinted metal oxide sol-gel material of claim 21.

26. A separations process employing the molecularly imprinted metal oxide sol-gel material of claim 21.

* * * * *